(12) United States Patent
Ring

(10) Patent No.: US 6,635,830 B2
(45) Date of Patent: Oct. 21, 2003

(54) METHOD OF WEIGHT MEASUREMENT USING MOVING WEIGH CONVEYOR

(75) Inventor: Timothy W. Ring, Schererville, IN (US)

(73) Assignee: Formax, Inc., Mokena, IL (US)

( * ) Notice: Subject to any disclaimer, the term of this patent is extended or adjusted under 35 U.S.C. 154(b) by 242 days.

(21) Appl. No.: 09/829,233

(22) Filed: Apr. 9, 2001

(65) Prior Publication Data
US 2003/0024744 A1 Feb. 6, 2003

(51) Int. Cl.⁷ .......................... G01G 19/34; G01G 19/03
(52) U.S. Cl. ................. 177/25.13; 177/145; 177/25.19; 702/175; 83/77; 53/53
(58) Field of Search .......................... 177/25.11, 25.12, 177/25.13, 119, 120, 121, 122, 123, 145, 16, 17, 1, 50, 25.19; 83/77; 53/506, 53; 702/173, 174, 175

(56) References Cited

U.S. PATENT DOCUMENTS

| | | | |
|---|---|---|---|
| 3,200,864 A | 8/1965 | Gillmann | 83/73 |
| 3,513,921 A | 5/1970 | Refer et al. | 177/16 |
| 3,846,958 A | 11/1974 | Divan | 177/120 |
| 3,905,259 A | 9/1975 | Spooner | 177/120 |
| 3,995,517 A | 12/1976 | Smith | 177/121 |
| 4,038,531 A | 7/1977 | Loe, Jr. | 177/121 |
| 4,065,911 A | 1/1978 | Fagan | 177/121 |
| 4,258,811 A | 3/1981 | Franzon et al. | 177/200 |
| 4,260,034 A | 4/1981 | Randolph, Jr. | 177/211 |
| 4,347,903 A * | 9/1982 | Yano et al. | 177/25.11 |
| 4,379,416 A | 4/1983 | Kuchler | 83/23 |
| 4,545,447 A | 10/1985 | Spooner et al. | 177/165 |
| 4,682,664 A | 7/1987 | Kemp | 177/16 |
| 4,763,738 A | 8/1988 | Kuchler | 177/50 |
| 4,788,930 A | 12/1988 | Matteau et al. | 177/16 |
| 4,794,996 A | 1/1989 | Wallace et al. | 177/25.14 |
| 4,951,763 A | 8/1990 | Zimmerman et al. | 177/164 |
| 5,109,936 A | 5/1992 | Ruppel | 177/25.19 |
| 5,119,894 A * | 6/1992 | Crawford et al. | 177/145 |
| 5,294,756 A | 3/1994 | Lauber et al. | 177/119 |
| 5,300,736 A | 4/1994 | Ehrhardt | 177/145 |
| 5,499,719 A | 3/1996 | Lindee et al. | 209/703 |
| 5,585,604 A | 12/1996 | Holm | 83/27 |
| 5,724,874 A | 3/1998 | Lindee et al. | 177/16 |
| 5,773,766 A | 6/1998 | Kinoshita et al. | 177/45 |
| 5,949,031 A | 9/1999 | Vande Berg | 177/133 |
| 6,137,066 A | 10/2000 | Wanelid | 177/25.13 |
| 6,433,288 B1 * | 8/2002 | Olafsson | 177/145 |

FOREIGN PATENT DOCUMENTS

EP 0288 592 B1 11/1988

* cited by examiner

Primary Examiner—Randy Gibson
(74) Attorney, Agent, or Firm—Polit & Erickson, LLC

(57) ABSTRACT

A control for a weigh scale associated with a continuously moving conveyor which is capable of mathematically positioning the sample period on each product weight waveform. The control first triggers on a predetermined sensed weight. The control determines a first inflection point on the weight waveform defined as the "maximum positive slope." Once the maximum positive slope is found, the control begins recording weight samples at a sampling rate. The control checks the weight waveform of sampled weights for a slope which is a first pre-selected percentage of the maximum slope but negative in slope value. This point is determined as the "weight-off-scale" point. When the weight-off-scale point is reached, then the control looks backward through the recorded data of weight samples to find another point which has a slope which is a second preselected negative percentage of the maximum positive slope. This point is defined as the "end sample position." With the end sample position known, a "start sample position" is determined to fall within, or at the start of, a flat region of the waveform, such that the weight values within a sample period between the start and end sample positions are substantially constant. The weight values within the sample period are then averaged to determine a static weight value.

18 Claims, 3 Drawing Sheets

METHOD OF WEIGHT MEASUREMENT USING MOVING WEIGH CONVEYOR

TECHNICAL FIELD OF THE INVENTION

The present invention relates to dynamic weight measurement, and particularly to a continuously moving weigh conveyor for weighing individual quantities of product to be packaged.

BACKGROUND OF THE INVENTION

Many different kinds of food loaves are produced in a wide variety of shapes and sizes. Meat loaves consisting of ham, pork, beef, lamb, turkey, fish and other meats have been commercialized. Such meat loaves or cheese loaves or other food loaves are commonly sliced and collected in groups in accordance with a particular weight requirement, the groups being packaged and sold at retail. The number of slices in a group may vary depending on the size and consistency of the food loaf. For some products, neatly aligned stacked sliced groups are preferred, while for other products the groups are shingled so that a purchaser can see a part of every slice through transparent packaging. For bacon or other food products of variable shape, the slicing and packaging problems are more challenging.

To properly allocate a sufficient number of slices or a sufficient overall weight of the group of slices, a weighing operation is undertaken in line with the slicing operation. This is particularly advantageous in the application of high-speed slicers employed in meat processing plants.

Some known high-speed food loaf slicing machines are disclosed, for example, in U.S. Pat. Nos. 5,566,600; 5,704,265; and 5,724,874.

It is known to weigh a stack of sliced product transported on a conveyor from a slicing operation. Such a "check-weighing" operation is disclosed, for example, in U.S. Pat. Nos. 3,846,958 and 4,065,911. However, in order to make such a measurement on a dynamic-weigh basis, the prior art weigh scale methods utilize an optical or other external triggering device to activate the weigh scale for choosing an accurate sample period. The sample period is set on a fixed timing basis from the trigger of the triggering device.

The present inventor has recognized the desirability of providing a dynamic-weigh checker for a conveyed series of products, or groups or stacks of products, which does not rely on an external triggering device to ascertain the correct sample period of the product, or groups or stacks of products, moving over the associated weigh scale.

SUMMARY OF THE INVENTION

The present invention provides a data acquisition and/or control device for a conveyor weigh scale or "weigh scale control" and a method for operating a conveyor weigh scale that automatically determines the correct sample period for accurately weighing product carried over the weigh scale. The present invention provides an algorithm for effective data acquisition and/or control associated with such a weighing operation. The weigh scale and control of the present invention can advantageously be configured to be combined with a high speed slicing apparatus and can give feedback on product output weight to be used as a control parameter for the slicing apparatus.

According to the invention, a conveyor weigh scale senses a dynamic weight of product as it passes over the weigh scale. This dynamic weight can be expressed as a weight waveform of sensed weight over time as the product passes over the weigh scale. An accurate weight reading for a moving product can be made only during a brief sample period within the waveform, where the weight readings are substantially constant and representative of the static weight of the product. Prior known continuously moving product scales have used devices such as a laser sensor or photosensitive components to detect when a product has entered the scale and then uses fixed timing numbers to estimate the position of the sample period on the weight waveform to make a weight measurement.

The present invention provides a software algorithm for a weigh scale associated with a continuously moving conveyor which is capable of positioning the sample period on each product weight waveform wherein the weight and speed of the product passing over the scale does not affect the positioning of the sample period. The sample period is calculated mathematically using the slope characteristics of the waveform.

The algorithm first looks for a minimum preselected positive amount of weight deviation to activate or establish a "trigger". A first inflection point, that point where the rate of weight change over time $dW/dt$ (the slope of the waveform), first decreases; i.e., the waveform changes from a more positive slope to a less positive slope, is determined. The slope at the first inflection point is recorded and defined as the "maximum positive slope" $dW1/dt$. Once the maximum positive slope is found, the algorithm begins recording weight samples at a sampling rate. The algorithm checks the weight waveform of sampled weights for a slope $dW2/dt$ which is a first pre-selected percentage of the maximum slope but negative in slope value. The first pre-selected percentage is preferably about −50% of the maximum slope $dW1/dt$. This point is determined as the "weight-off-scale" point.

When the weight-off-scale point is reached, then the algorithm will look backward (reverse chronological order) through the saved data of weight samples to find another point which has a slope $dW3/dt$ which is a second preselected negative percentage of the maximum positive slope $dW1/dt$. The second pre-selected negative percentage is preferably about −10% of the maximum positive slope. This point is defined as the "end sample position." The end sample position is experimentally known to be on or close to a flat part of the waveform representing substantially constant weight values.

With the end sample position known, a "start sample position" is determined to fall within, or at the start of, the flat part of the waveform, such that the weight values within the sample period between the start and end sample positions are substantially constant. The start sample position can be calculated as a first point having a predetermined slope on the waveform, reviewing the weight samples in reverse chronological order from the end sample position; or can be experimentally determined to be within a preselected number of sample points in front of the end sample position. The weight values within the sample period are then averaged to determine a static weight value.

In an apparatus configured according to the invention no extra hardware cost is required for a separate triggering device, separate from the weigh scale device. The apparatus of the invention requires no adjustment for weight changes of the product moving over the scale. According to the invention, no synchronization is required between a separate triggering device and the scale device. The apparatus of the invention achieves an increased operational reliability by eliminating the need for a separate triggering device.

Another advantage of the invention is the ability of the software algorithm to compensate for product which may have a different orientation from stack to stack, either intentionally or accidentally. A narrow product, which moves onto the weigh scale with different orientations will produce longer and shorter weight waveforms. The algorithm positions the sample period from the trailing edge of the waveform which eliminates many orientation-based weighing problems experienced by trigger and fixed-timing weigh systems.

Other features and advantages of the present invention will become readily apparent from the following detailed description and the accompanying drawings.

DETAILED DESCRIPTION OF THE PREFERRED EMBODIMENTS

Figure 1:
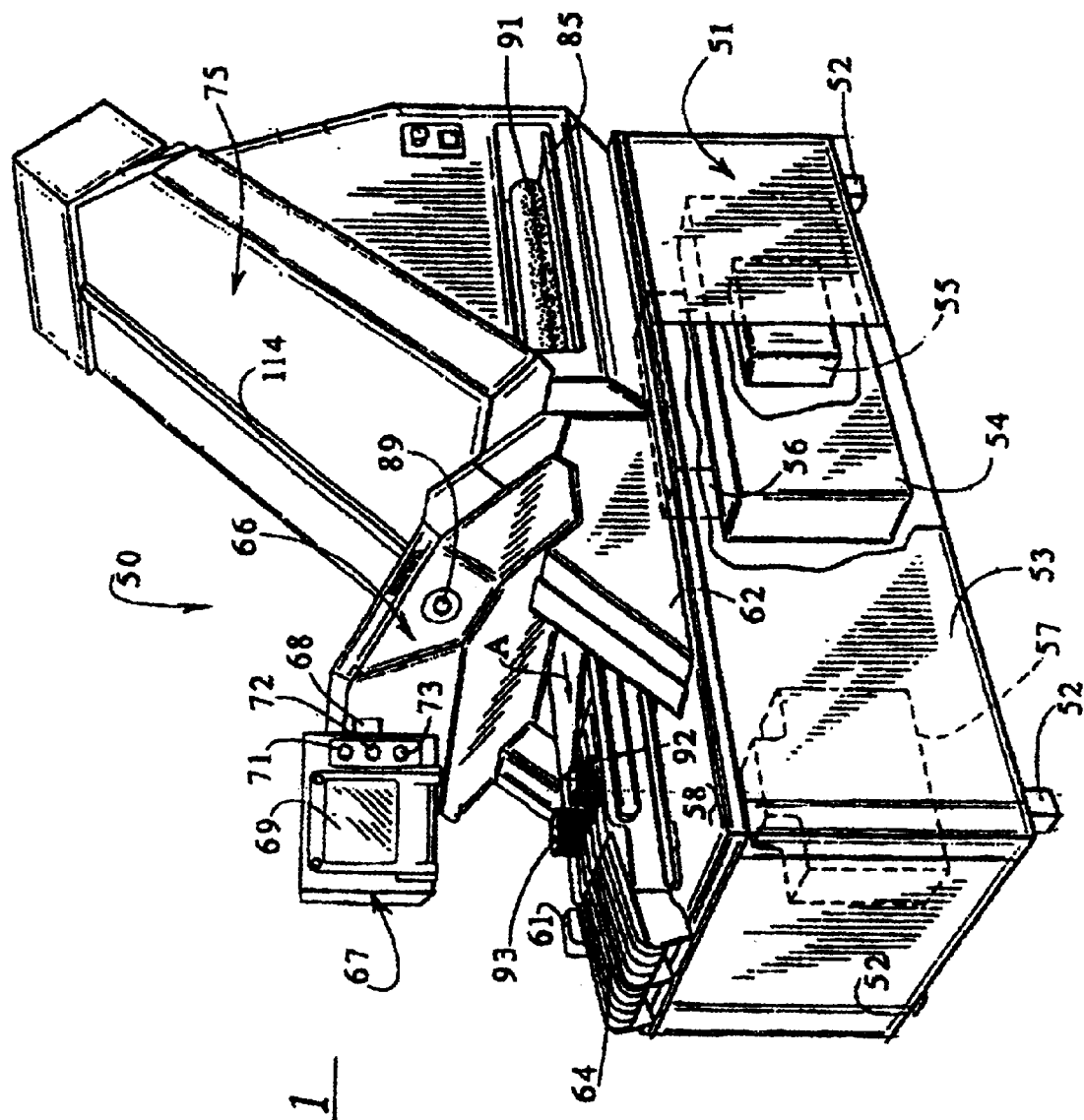
FIG. 1 is a perspective view of a high speed slicing machine which incorporates the weigh scale control of the present invention.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

FIG. 1 illustrates a versatile food loaf slicing machine 50 that can be used to carry out a preferred embodiment of the present invention. The slicing machine 50 is of the type described in U.S. Pat. Nos. 5,561,600; 5,704,265 and 5,724,874 herein incorporated by reference. Slicing machine 50 comprises a base 51 mounted upon four fixed pedestals or feet 52 and having a housing or enclosure 53 surmounted by a top 58. Base 51 typically affords an enclosure for a computer 54, a low-voltage supply 55, a high voltage supply 56, and a weigh checker or weigh scale 57.

Slicing machine 50, as seen in FIG. 1, includes a conveyor drive 61 that is utilized to drive an output conveyor/classifier system 64. The conveyor classifier system 64 is described for example in U.S. Pat. Nos. 5,704,265 or 5,499,719, herein incorporated by reference, and is responsive to the weigh scale 57 to direct products within a weight tolerance to an "accept" conveyor, and to direct out-of-weight tolerance products to a "reject" conveyor.

The slicing machine 50 of FIG. 1 further includes a computer display touch screen 69 in a cabinet 67 that is pivotally mounted on and supported by a support 68. Cabinet 67 serves as a support for a cycle start switch 71, a cycle stop switch 72, and a loaf feed on/off switch 73. Switches 71–73 and display/touch screen 69 are electrically connected to the computer 54 in the base 51.

The upper right-hand portion of the slicing machine 50, as seen in FIG. 1, comprises a loaf feed mechanism 75 which, in machine 50, includes a manual feed on the far side of the machine and an automatic feed on the near side of the machine.

As shown in FIG. 1, slicing machine 50 is ready for operation. There is a food loaf 91 on tray 85, waiting to be loaded into loaf feed mechanism 75 on the near-side of machine 50. Machine 50 can produce a series of stacks 92 of food loaf slices that are fed outwardly of the machine, in the direction of the arrow A by conveyor classifier system 64. Machine 50 can produce a series of stacks 93 of food loaf slices that also move outwardly of the machine on its output conveyor system 64 in the direction of arrow A. Stack 92 as shown comprises slices from a rectangular loaf, and stack 93 as shown comprises slices from a round loaf. Both groups of slices can be overlapping, "shingled" groups of slices rather than having the illustrated stack configuration.

The weigh scale 57 is operatively connected to the conveyor 64 such that the weigh scale 57 continuously senses the weight of the sliced product or product groups appearing in succession on the scale. The weigh scale 57 in turn outputs a continuous succession of weight readings or samples at regular time intervals to define corresponding waveforms which are, in effect, dynamic weight measures of the product groups sensed by the scale over time. As an example, the weight readings are sampled at a sample rate of 500 samples per second, filtered to 150 samples per second, with a conveyor speed of 107 product stacks per minute. The sampling rate can be adjusted to vary with the conveyor speed. The filtering can be done electronically or by software methods, preferably the latter. Filtering is used in part to compensate for inaccurate readings due to impact loads as product first appears over the weigh scale. The product stacks typically range from between about 25 grams to about 1000 grams.

It should be noted that an analog weight signal from the weigh scale can be sampled and filtered at the weigh scale 57 with the resulting sampled signal communicated to the computer 54, or the analog signal from the weigh scale can be sampled and filtered by the computer 54.

Analyzing the weight readings over time (the waveform) of a single product group of slices, can be used to ensure sufficient weight portioning for each group. However, since the weight and velocity of the product moving over the weigh scale affects the dynamic weight reading, a method must be used to ascertain an appropriate sample period during each waveform which passes over the weigh scale to obtain a measurement which accurately represents a static weight of the product.

Figure 2:
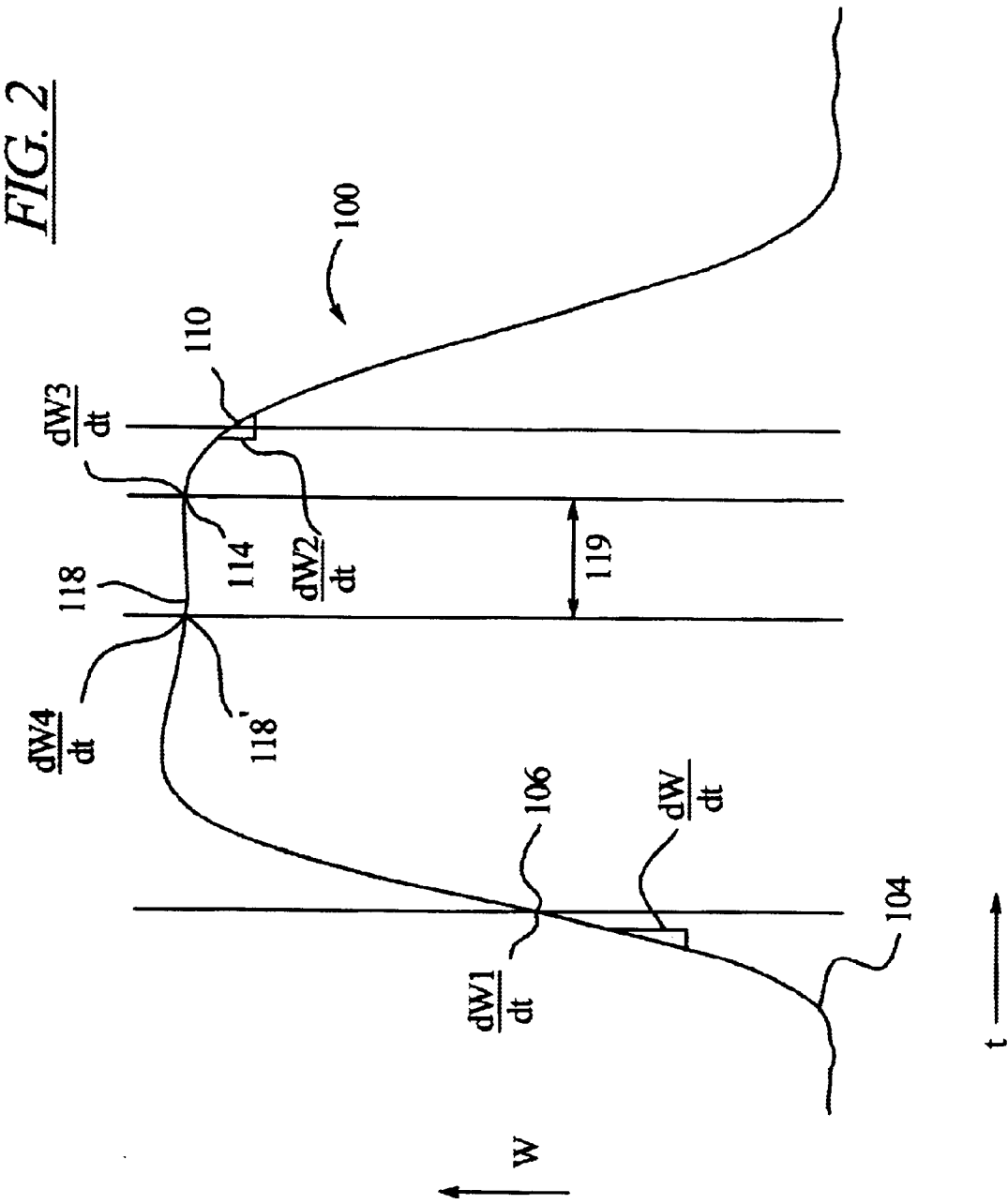
FIG. 2 is a dynamic weight waveform sensed by the weigh scale.

FIG. 2 illustrates one such waveform 100. The waveform 100 is a representation of a filtered and sampled continuous signal from the scale 57. The weigh scale control of the invention uses the sampled weight readings represented by the waveform to determine a sample period on the waveform which corresponds to a static weight of the product being weighted. The weigh scale control includes a software algorithm. The algorithm calculations, comparisons, and data recording of the weigh scale control can be done in part or in whole by the weigh scale 57 or in part or in whole by the machine control computer 54.

Figure 3:
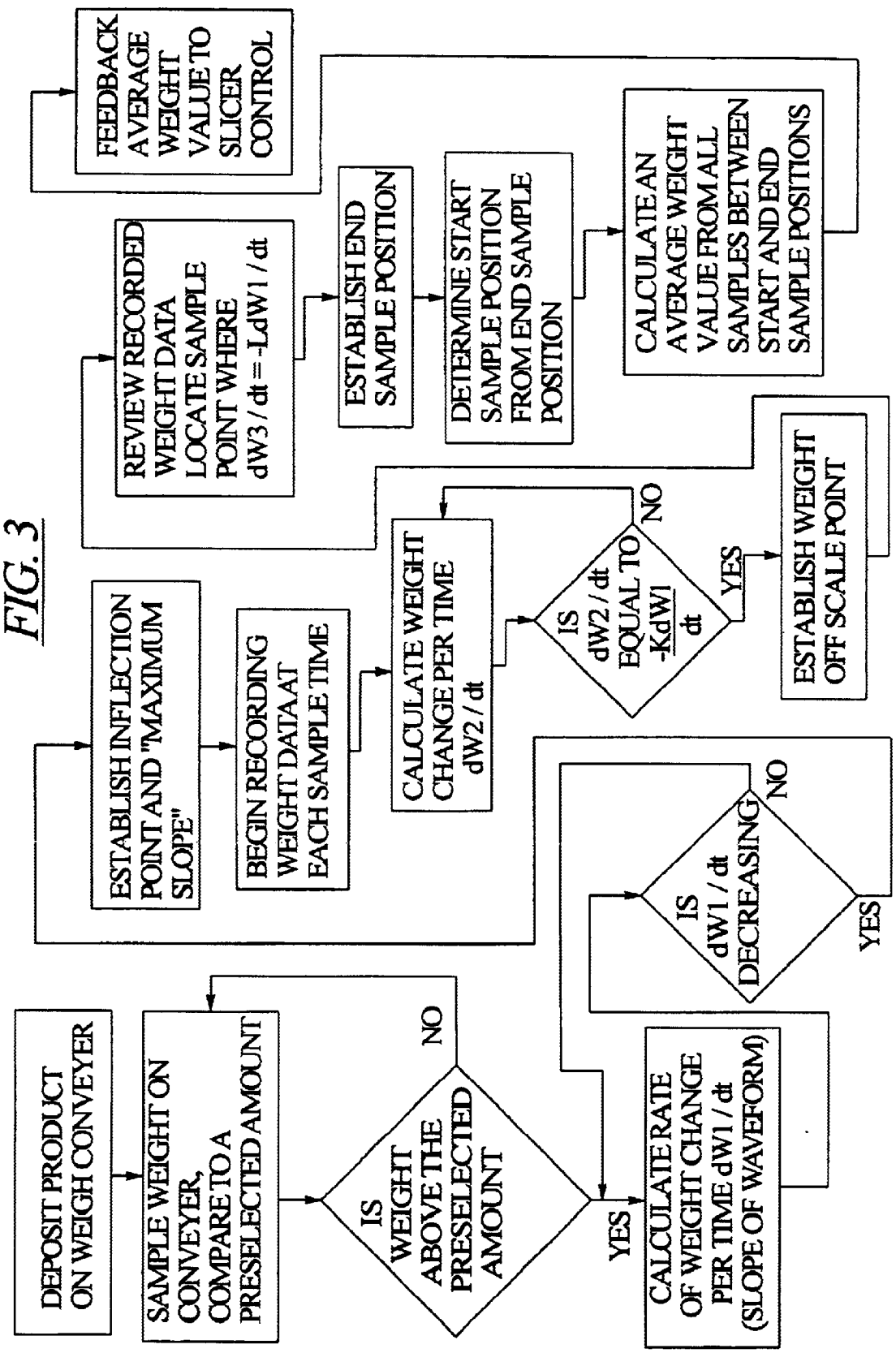
FIG. 3 is a flow chart for a computer control used in the weigh scale of the slicing machine shown at FIG. 1.

The steps of the algorithm are set forth in FIG. 3. The algorithm first looks for a minimum preselected positive amount of weight deviation to activate or establish a "trigger" position 104. The actual trigger position 104 on the waveform is not critical to the algorithm as long as the trigger position on the waveform occurs before a first inflection point 106. The first inflection point 106 is that point where the rate of weight change over time dW/dt (the slope of the waveform), first decreases; i.e., the waveform changes from a more positive slope to a less positive slope.

Once the trigger position 104 is located, the algorithm calculates the slope of the weight signal until the first inflection point 106 is determined. This slope is recorded and defined as the "maximum positive slope" dW1/dt. Once the maximum positive slope is found, the algorithm begins recording weight samples at a sampling rate. The samples can be recorded in a RAM within the control computer 54. The algorithm checks the weight waveform 100 of sampled weights for a slope dW2/dt which is a first pre-selected percentage of the maximum slope but negative in slope value. The first pre-selected percentage is preferably about −50% of the maximum slope dW1/dt. This point is determined as the "weight-off-scale" point 110. When the weight-off-scale point is reached, then the algorithm will look backward (reverse chronological order) through the saved data of weight samples to find another point which has a slope dW3/dt which is a second preselected negative percentage of the maximum positive slope dW1/dt. The second pre-selected negative percentage is preferably about −10% of the maximum positive slope. This point is defined as the "end sample position" 114. With the end sample position known, a "start sample position" 118 is determined.

A flat region 119 of the waveform extends backward, in reverse chronological order, from the end sample position 114, wherein the weight samples have a substantially constant value. The start sample position 118 can be experimentally determined by studying a waveform 100 and selecting an appropriate number of sample points in front of the end sample position 114 such that the start sample position falls within, or at the start of, the flat region 119, preferably as far in front of the end sample position 114 as possible, to utilize a maximum amount of samples within the flat region to calculate an overall more accurate weight reading.

Alternatively, a start sample position 118' can be calculated by reviewing waveform slopes dW/dt, i.e., the rate of sampled weight change over time at each sample point, from the end sample position 114 backward, in reverse chronological order. A calculated start sample position 118' is defined when the calculated slope dW4/dt first reaches + or −10% of the maximum positive slope dW1/dt. This calculated method would ensure that the entire flat region of the waveform was sampled to determine the static weight reading.

The static or average weight reading for the dynamically weighed product is calculated as an average from the recorded weight samples between the start and end sample positions 118 (or 118'), 114.

The average weight reading can be used to reject out-of-tolerance product or products, or can be used as a feedback control for the slicer to slice thicker or thinner slices or to include more or less slices for each group of slices. A slicer control is described in U.S. Pat. Nos. 3,846,958 or 5,109,936 herein incorporated by reference.

The invention recognizes that a reason a percentage of the maximum slope is used to determine the weight-off-scale point is because different weight products will cause different amounts of waveform distortion at the leading edge of the weight signal. Greater values of weight will create greater values of distortion. If a fixed number of samples after the trigger was used to determine the weight-off-scale position, then the distortion caused by larger weights would cause the weight sample period to be positioned improperly on the waveform. Heavier weights cause premature negative slopes occurring before the sample period which are not really the weight moving off the weigh scale. The use of any negative slope to identify the weight-off-scale position would most likely yield inaccurately calculated static weight results.

The percentage calculation used to determine the weight-off-scale position on the waveform is empirically derived based on an analysis of the product being weighed. It has been empirically determined that this percentage should be about −50 percent of the maximum positive slope. Likewise, the percentage of maximum positive slope which determines the end sample position is empirically determined and has been found to advantageously be about −10 percent.

According to the invention, a dynamic weigh scale algorithm provides a method of automatically determining a corrected weight measurement from a weight waveform without the need for a separate laser or optical triggering device with a timing calculation, in order to extract the accurate weight measurement of the product or the product group.

Although the invention is described in regards to weighing a group of slices to be shingled or stacked, the invention can also be applied to weighing a series of single slices. Also, the weigh scale control can be part of a weigh scale electronics and software configuration or can be incorporated into the machine computer or controls without departing from the invention.

Although the present invention has been described in substantial detail with reference to one or more specific embodiments, those of skill in the art will recognize that changes may be made thereto without departing from the scope and spirit of the invention as set forth in the appended claims.

What is claimed is:

1. A method of extracting a static weight measurement from a moving product on a weigh scale, comprising the steps of:
   making a continuous weight measurement of the product passing over the weigh scale;
   when a preselected increase in weight measurement is sensed, commencing to continuously calculate the rate of weight change over time;
   after a maximum positive rate of weight change over time occurs, immediately after which the rate of weight change over time begins to decrease, commencing to continuously record weight measurements;
   when the rate of weight change over time reaches a first preselected negative percentage of the maximum positive rate of weight change over time, in reverse chronological order, reviewing previously recorded weight measurements and determining an end sample position defined at a second preselected negative percentage of the maximum positive rate of weight change over time, said second preselected negative percentage less negative than said first preselected negative percentage;
   determining a start sample position within said recorded weight measurements, such that a range of weight measurements taken between said start and end sample positions are substantially constant in magnitude; and
   calculating an average weight between said end sample position and said start sample position of the recorded weight measurements as the extracted static weight measurement of the moving product.

2. The method according to claim 1, wherein said step of determining said start sample position is further defined by the steps of predetermining said range of weight measurements experimentally for the product being weighed.

3. The method according to claim 1, wherein said step of determining said start sample position is further defined by the steps of reviewing the weight measurements in reverse chronological order from said end sample position and determining a select reviewed weight measurement wherein the rate of weight change over time is equal to a preselected rate, and establishing the select reviewed weight measurement as the start sample position.

4. The method according to claim 1, wherein said step of determining a preselected negative percentage of the maximum positive rate of weight change over time is further defined in that said preselected negative percentage is experimentally determined.

5. The method according to claim 1, wherein said step of determining a preselected negative percentage of the maximum positive rate of weight change over time to determine the end sample position is further defined in that the preselected negative percentage is experimentally determined.

6. The method according to claim 1, wherein said product comprises a group of food product slices to be individually packaged.

7. The method according to claim 6, wherein the extracted weight signal is fed back to a slicing control to change the weight of food product within subsequent groups.

8. The method according to claim 1, wherein the weight measurements are stored in a memory.

9. The method according to claim 1, wherein said step of making a continuous weight measurement is further defined in that said continuous weight measurement is a continuous stream of sampled weight measurements over time.

10. A method of extracting a static weight measurement from a moving product on a weigh scale, comprising steps of:
    making a continuous weight measurement of the product passing over the weigh scale; and
    mathematically determining a sample period during which the product is over the weigh scale by calculating slopes on a weight measurement-over-time waveform of the continuous weight measurement and determining the location of the sample period on the waveform based on at least one calculated slope on the waveform, averaging weight measurements taken during said sample period to obtain a dynamic weight measurement substantially equivalent to a static weight of the product.

11. A method of extracting a static weight measurement from a moving product on a weigh scale, comprising steps of:
    making a continuous weight measurement of the product passing over the weigh scale; and
    mathematically determining a sample period during which the product is over the weigh scale, an average weight measurement during said sample period representing a dynamic weight measurement substantially equivalent to a static weight of the product;
    wherein said step of mathematically determining the sample period comprises the steps of:
        determining the location of a predetermined negative slope on a trailing side of the weight-measurement-over-time waveform;
        from the location of the predetermined negative slope, locating an end sample position as a percentage of the predetermined negative slope, reviewing slopes backward chronologically from the location; and
        determining a start sample position as a predetermined distance on the waveform from said end sample position.

12. The method according to claim 11, wherein said predetermined negative slope is calculated as a negative percentage of a maximum positive slope on a front side of the waveform.

13. A method of extracting a static weight measurement from a moving product on a weigh scale, comprising steps of:
    making a continuous weight measurement of the product passing over the weigh scale; and
    mathematically determining a sample period during which the product is over the weigh scale, an average weight measurement during said sample period representing a dynamic weight measurement substantially equivalent to a static weight of the product;
    wherein said step of mathematically determining the sample period comprises the steps of:
        determining the location of a predetermined negative slope on a trailing side of the weight-measurement-over-time waveform;
        from the location of the predetermined negative slope, locating an end sample position as a percentage of the predetermined negative slope, reviewing slopes backward chronologically from the location; and
        determining a start sample position as a positive percentage of the predetermined negative slope, reviewing slopes backward chronologically from the end sample position.

14. The method according to claim 13, wherein said predetermined negative slope is calculated as a negative percentage of a maximum positive slope on a front side of the waveform.

15. The method according to claim 10, wherein said step of mathematically determining the sample period comprises the steps of:
    determining the location of a predetermined negative slope on a trailing side of the weight-measurement-over-time waveform;
    from the location of the predetermined negative slope, locating an end sample position as a percentage of the predetermined negative slope, reviewing slopes backward chronologically from the location; and
    determining a start sample position as a predetermined distance on the waveform from said end sample position.

16. The method according to claim 15, wherein said predetermined negative slope is calculated as a negative percentage of a maximum positive slope on a front side of the waveform.

17. The method according to claim 10, wherein said step of mathematically determining the sample period comprises the steps of:
    determining the location of a predetermined negative slope on a trailing side of the weight-measurement-over-time waveform;
    from the location of the predetermined negative slope, locating an end sample position as a percentage of the predetermined negative slope, reviewing slopes backward chronologically from the location; and
    determining a start sample position as a positive percentage of the predetermined negative slope, reviewing slopes backward chronologically from the end sample position.

18. The method according to claim 17, wherein said predetermined negative slope is calculated as a negative percentage of a maximum positive slope on a front side of the waveform.

* * * * *